Jan. 2, 1940.  W. W. LASKER  2,185,258
TABULATING MACHINE
Filed Aug. 9, 1933   8 Sheets-Sheet 1

Fig. 1.

INVENTOR
William W. Lasker
by
ATTORNEY

Jan. 2, 1940.  W. W. LASKER  2,185,258
TABULATING MACHINE
Filed Aug. 9, 1933  8 Sheets-Sheet 2

Fig. 2.

INVENTOR
William W. Lasker
by
Clemens H. Killian
ATTORNEY

Jan. 2, 1940.  W. W. LASKER  2,185,258
TABULATING MACHINE
Filed Aug. 9, 1933  8 Sheets-Sheet 3

FIG.3.

INVENTOR
W. W. LASKER, DECEASED
W. W. LASKER, JR., EXECUTOR
BY *W. A. Sparks*
ATTORNEY Jan. 2, 1940.   W. W. LASKER   2,185,258
TABULATING MACHINE
Filed Aug. 9, 1933   8 Sheets-Sheet 4

Fig. 4.

WITNESSES

INVENTOR
William W. Lasker
by
ATTORNEY

Jan. 2, 1940.  W. W. LASKER  2,185,258
TABULATING MACHINE
Filed Aug. 9, 1933  8 Sheets-Sheet 5

INVENTOR
W.W. LASKER,
DECEASED
W.W. LASKER, JR.
EXECUTOR
BY *W. A. Sparks*
ATTORNEY Jan. 2, 1940.　　　　W. W. LASKER　　　　2,185,258
TABULATING MACHINE
Filed Aug. 9, 1933　　　8 Sheets-Sheet 7

INVENTOR
W.W. LASKER, DECEASED
W. W. LASKER, JR., EXECUTOR
BY
ATTORNEY

Jan. 2, 1940.  W. W. LASKER  2,185,258
TABULATING MACHINE
Filed Aug. 9, 1933  8 Sheets-Sheet 8

Patented Jan. 2, 1940

2,185,258

UNITED STATES PATENT OFFICE 2,185,258

TABULATING MACHINE

William W. Lasker, Brooklyn, N. Y., assignor to Remington Rand Inc., Buffalo, N. Y., a corporation of Delaware Application August 9, 1933, Serial No. 684,438

8 Claims. (Cl. 235—61.9)

This invention relates to record controlled tabulating machines and particularly to means for controlling the taking of different grades of totals in such machines.

The principal object of this invention is to provide means for variably controlling naught blocks in a plurality of computing units whereby a plurality of different grades of totals may be obtained from said computing units.

Another object of this invention is to improve the construction and manner of operation of naught blocks.

Another object of this invention is to provide improved means for both automatic and manual control of naught blocks.

Other objects of the invention are disclosed in the following detailed description.

One embodiment of the invention is illustrated in the accompanying drawings in which.

General description

In the embodiment shown herein, the present invention is arranged to function in conjunction with a conventional type of Powers tabulator similar to that disclosed in Patent to W. W. Lasker No. 2,044,119, issued June 16, 1936. Tabulators of this type are being regularly manufactured and have been in general commercial use for several years. Therefore, a brief description of the several essential operating mechanisms therein will suffice for the purposes of the present disclosure.

Figure 1:
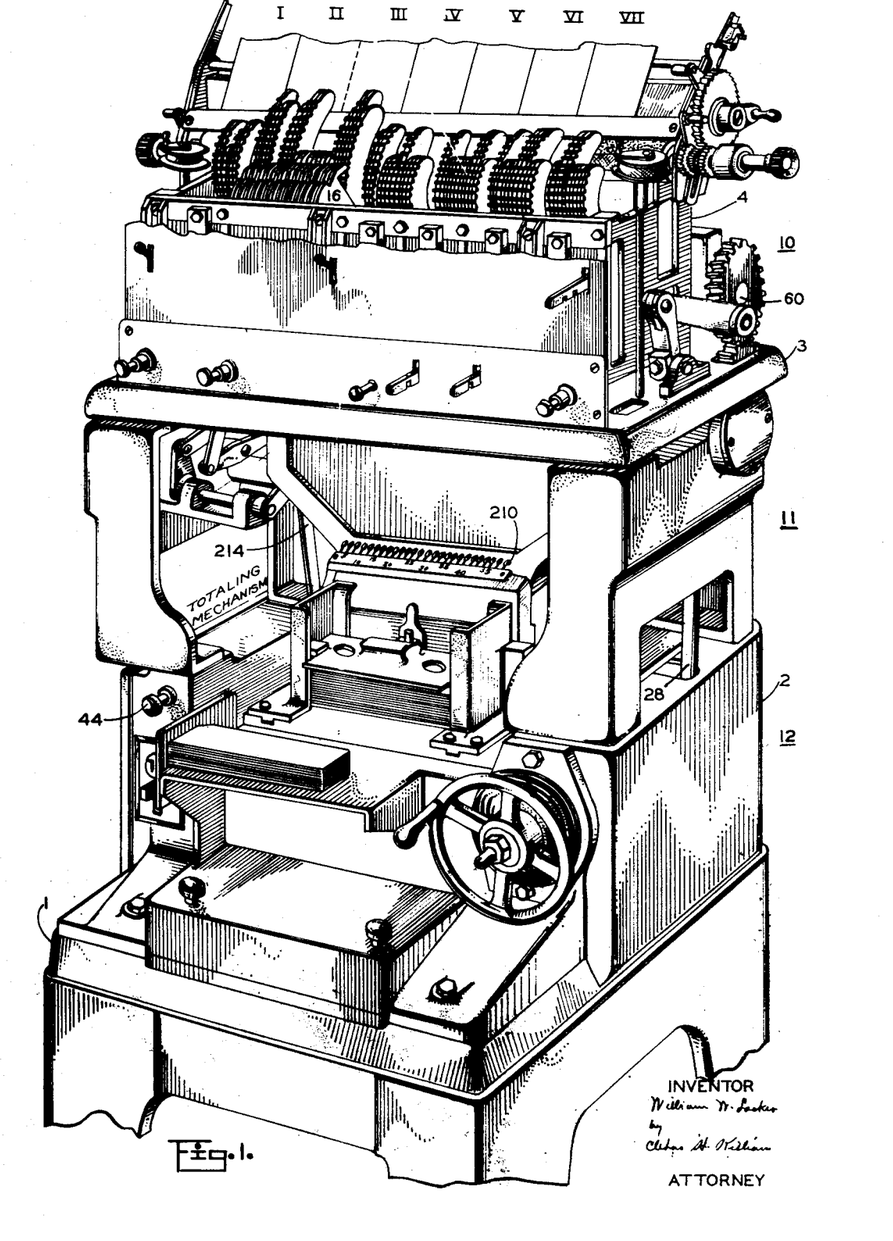
Fig. 1 is an isometric view of a typical Powers tabulating machine.

The Powers tabulator can be divided into three main components, the computing component 10 (Fig. 1), the intermediate component 11, and the base component 12. The base component contains the card magazine, card feeding mechanism, sensing mechanism, total taking mechanism, main drive mechanism, and a suitable framework therefor.

The intermediate component consists of an open frame for separating the base and computing components, and a translator unit for transmitting the data contained in the records from the sensing mechanism to the computing component. Mounted on the translator frame are a plurality of naught blocks, and the operating mechanism therefor, for controlling the operation of the computing units during total taking operations.

The computing component contains the mechanism for summarizing the items or data occurring as separate entities on the perforated cards fed through the base component. The computing component is ordinarily constructed with seven computing units. A greater or lesser number of computing units may be used in specific instances. Each computing unit comprises a series of type carriers having actuators operatively connected thereto, an accumulator, a printing hammer assembly, and stop basket assembly. Common to all the computing units is a main drive mechanism, a total shaft, a paper supporting platen and carriage with its paper feeding mechanism and ribbon feed devices, etc.

Throughout this specification it will be understood that all shafts, levers, and movable parts generally are supported by or carried by the main framework, even though such is not specifically mentioned. All links, and the link-like elements will be considered as loosely pivoted to the supporting elements unless otherwise specifically stated. Many of the links consist of two elements joined together for the purpose of assembly adjustments. In general such construction is not shown, for to do so would unnecessarily complicate the drawings. It is also to be understood that many of the arms are provided with set screws or friction clamps for corresponding adjustments. Many elements, for example the total shaft 220, have oscillatory movements. Suitable limit stops are provided to prevent over-running, or under-running, or both. Such stops will not be further mentioned or described for their existence will be tacitly assumed. Elements which are carried or borne by movable elements will be specifically mentioned herein. In many instances spring clips, cotter pins, enlarged or riveted heads, or other fastening devices are omitted from both the drawings and detailed description. The terms "forward", "rearward", and their grammatical variations occur throughout this specification. These terms refer to the relative locations of the parts as viewed in Fig. 1. Thus, "forward" always means towards the observer in Fig. 1, and "rearward" always means away from the observer. The adoption of these conventions will considerably shorten the detailed description without detracting from the clarity of the described mode of construction and operation.

Framework

The machine as a whole is mounted on suitable legs attached to a main base plate 1 (Fig. 1) and on said base are a pair of box-like frames 2 in which are housed the principal elements of the driving mechanism and card feeding and sensing mechanisms. Spanning the tops of said box-like frames are supporting rails and auxiliary frames for carrying the principal elements of the change of designation sensing mechanism and the total taking mechanism, and, also, the grooved supports for the translator unit. Mounted on top of each box-like frame are the frames of the intermediate component which are bridged at their tops by the base 3 of the computing component. Mounted on base 3 is a series of frames 4 for supporting the computing units. Frames 4 are connected by suitable tie rods which also serve as supporting shafts for the restoring bails of each computing unit as described under the heading "Main drive." Frames 4 are arranged to support a drive shaft 60, the printing hammer assemblies of each computing unit, and a stop tray for supporting the stop baskets of each computing unit.

Main drive

For the purpose of driving the tabulator there are a number of shafts and units which operate in the same manner during each machine cycle. The entire assembly of these elements is called the main drive mechanism.

A suitably mounted shaft 24 (Fig. 2) is driven by any convenient source, such as an electric motor, to which it is connected by a belt and a suitable clutch mechanism operable under control of a starting and stopping button 44 (Fig. 1), as in Patent No. 2,044,119. Integral with shaft 24 (Fig. 2) is a series of worms for driving the base main shaft 26 which serves for reciprocating the sensing pin box through a pair of eccentrics, and for intermittently operating certain mechanisms by a cam assembly generally designated by reference character 27, which is more particularly described under the heading "Total taking mechanism." Fixed to one end of shaft 26 is a mitre gear meshing with its companion fixed to an inclined shaft 28 for driving the mechanism of the computing head. A worm on shaft 24 drives a gear fixed to the lower of the pair of feed rolls 30, and another worm drives the lower of the eject rolls 31 in a similar manner. The feed rolls 30 feed the card into a sensing chamber, where it is gripped at each end by a pair of skid rolls 32 of usual construction, which, in turn, are driven from a worm on the shaft 24. Cooperating with each skid roll there is the usual frictionally driven spring pressed skid roll (not shown) for holding the card against the skid roll.

Figure 2:
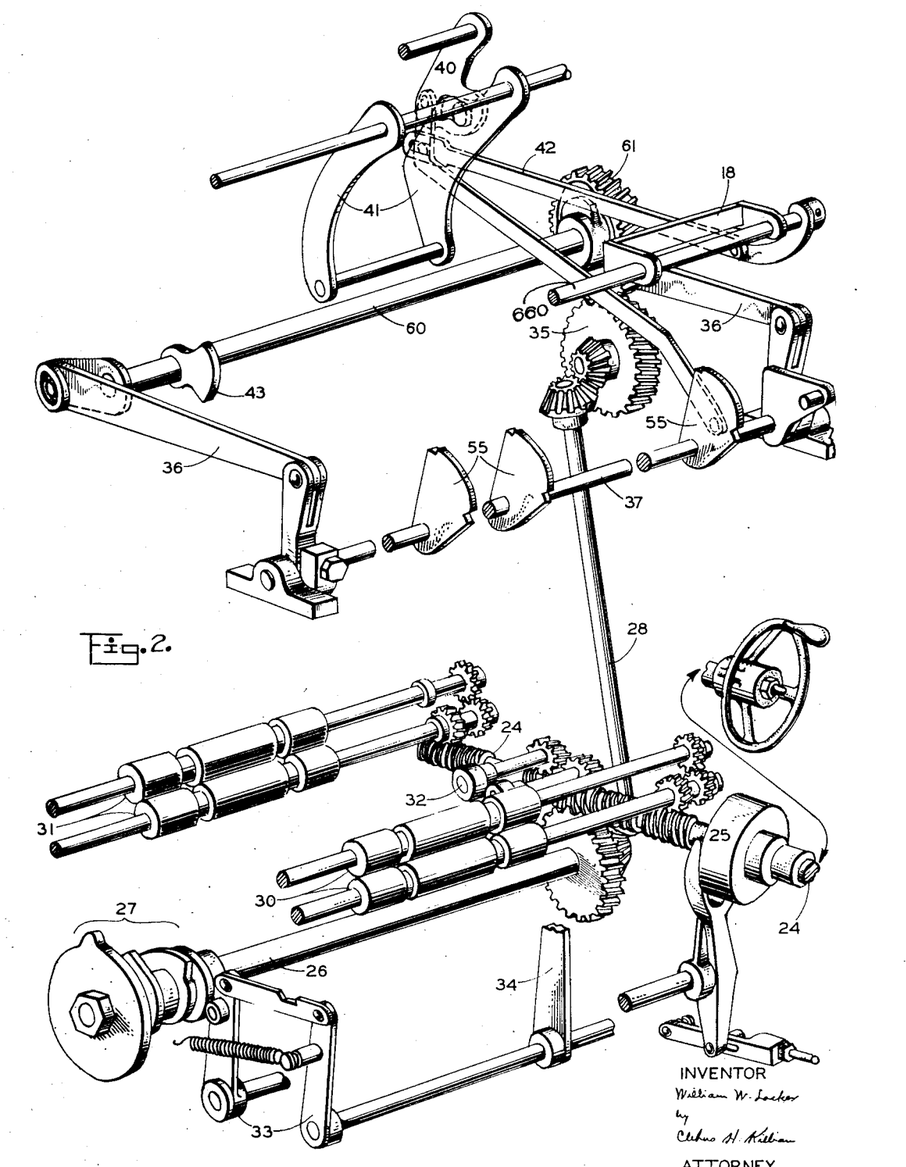
Fig. 2 is an isometric view of the essential elements of the main driving mechanism of the tabulator shown in Fig. 1.

One of the cams of cam assembly 27 operates on a roll attached to a spring urged lever assembly 33, for rocking the shaft to which the picker arm 34 is rigidly attached for feeding the cards seriatim to feed rolls 30. The arrangement and construction of the spring urged lever assembly 33 is such that it may be locked when the picker arm 34 is inclined, at its substantially forward position, to disable the picker, as will be described under the heading "Total taking mechanism."

Shaft 28 has on its upper end a mitre gear assembly for driving an idler gear 35 which, in turn, meshes with a gear 61, fixed to a shaft 60 near the rear of the computing component. Fixed to gear 61 is a link 36 for operating a rock shaft 37 through an arm fixed near the extremity of the said rock shaft. This link structure is duplicated at the opposite end of the shaft 60, utilizing an arm or crank in place of the gear 61. Connected to the shaft 37 through a strong spring arrangement is a series of fan cams 55, one for each computing unit, for operating the timing mechanism of the accumulators, as described hereinafter. Pivoted to each fan cam 55 is a rearwardly extending doubly off-set link pivoted to a lever 40 pivotally mounted on a transverse shaft. The lever 40 contains a bean-shaped cam opening through which projects a roller on one arm of a restoring bail assembly 41. The construction and arrangement is such that the lever 40 rocks an appreciable distance during the initial part of both its forward and its return movements before bail 41 is moved, thus permitting such functions as engagement or disengagement of the accumulators, release of the printing hammers, etc., to take place prior to a movement of the type carriers which are controlled by the said bail. A pin-in-slot and spring connection at the rearward end of the link joining 40 and 55, joins said link to a link 42, the forward end of which is connected to a crank fixed to rock shaft 660 on which is mounted the printing hammer controlling bail 18 of the associated computing unit. The mechanism including restoring bail 41 and printing hammer controlling bail 18 is provided for each computing unit and its function is described under the heading "Printing hammer mechanism."

Rigidly mounted on shaft 60 is a cam 43 for holding all the zero stops in retracted position when the machine is in its normal or stopping position. The mechanism controlled by cam 43 is more fully described under the heading "Zero stop control."

Card feeding and sensing

Machines of this class are controlled by perforated cards which are automatically read by a sensing mechanism, and the reading is transmitted to the computing or control mechanisms for controlling machine operations. The cards to be tabulated are stacked in a card magazine, from which they are picked seriatim by the picker mechanism 34 (Fig. 3), then fed to feed rolls 30, thence into the sensing chamber 94, where they are temporarily held by a suitably controlled card stop 95. Fixed to the main shaft 26 are two eccentrics that operate connecting links pivoted at opposite ends of a sensing pin box 96, which is moved upwardly and downwardly thereby once during each machine cycle. When a card is in the card chamber, the spring pressed sensing pins 97 which find perforations in the card, remain stationary relative to the sensing box 96, and are locked in such relatively stationary position by a series of locking slides 100, through the action of a strong spring which is normally restrained in the usual manner, by the lower arm of the lever 101 cooperating with a stationary cam 102. When sensing box 96 has been raised a predetermined distance, arm 101 passes beyond the range of cam 102, and the said strong spring shifts all the locking slides 100 to lock the pins 97 which have found perforations, but all other pins 97 remain stationary relative to the framework of the machine because of their contact with unperforated positions of the card in the sensing chamber. At about the time the sensing box 96 reaches its highest position, a set of intermediate pins 103 are latched in displaced positions corresponding to the sensing pins 97 which have found perforations. The sensing box 96 then descends, and as soon as the pins clear the card in the sensing chamber, the card stop 95 opens, and the skid rolls 32 feed the card to the pair of eject rolls 31, thence into a receiving magazine. When a pin 97 is latched in the sensing box by the cooperating slide 100, it will positively elevate the corresponding intermediate pin 103 against the action of its spring (the last mentioned spring is substantially stronger than the spring of the sensing pin) and continue to elevate it until it is latched in its elevated position by the cooperating spring pressed locking slide 104 of the reading retaining device. Cooperating with each pin 103 (or as many of the pins 103 as may be needed for a particular accounting problem) there is a translator wire slidably mounted in the translator frame.

The card stop 95 (Fig. 4) is in the form of an angle iron to which is fixed a pair of frame supported and guided slides operable by a pair of rockers 105 fixed to the shaft 106. One of said rockers has a rearwardly extending arm, which is connected by a link to an arm 108 fixed to the shaft 107, which shaft is, in turn, rocked at suitable times by a link 110 pivoted to a lever operated by one of the cams of the assembly 27. It is clearly seen, by tracing the series of elements recited in the preceding sentence, that the card stop 95 is in its lower or effective position when the link 110 is in its lower position. Also fixed to the shaft 107 is an arm 111 cooperating with a cam 112 of the total taking mechanism. As hereinafter described, cam 112 is stationary during tabulating operations, but, when it is moved from its quiescent position (as it is during total taking operations), card stop 95 will be held in its lower or effective position irrespective of the position of the card stop cam of the assembly 27.

Figure 4:
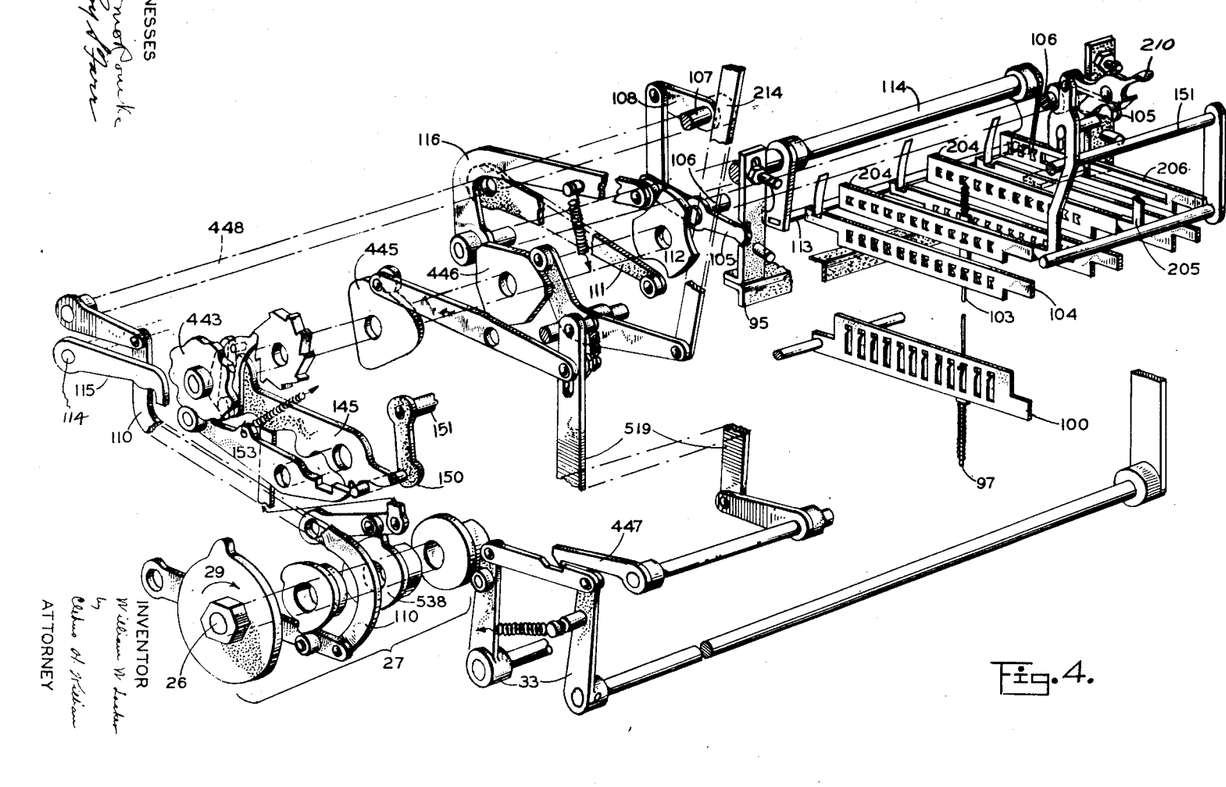
Fig. 4 is an exploded isometric view of the total taking mechanism and associated elements.

At about the time that the locked sensing pins 97 have reached their highest position, locking slides 104 are positively shifted against the tension of their springs by a universal bail 113, carried by arms fast to a shaft 114. Fixed to the end of shaft 114 is an arm 115 which overlies a link (not shown) controlled by cam 29 of the assembly 27, and which is provided with a single projection. Cam 29 operates universal bail 113 momentarily when the sensing pin box is in its highest position and serves to release all pins 103 that were locked in raised position in accordance with the perforations in the preceding card, and to lock all pins 103 that are raised in accordance with the perforations in the new card being sensed. Also fixed on shaft 114 is an arm 116 having a follower roller that cooperates with the aforementioned cam 112, which, as hereinafter described, serves to rock shaft 114 counter-clockwise to prevent the locking of any pins 103 during total taking operations.

Change of designation sensing mechanism

In machines of this type, means are provided to detect changes of designation in successive cards being fed through the sensing mechanism and to initiate the operation of the total taking mechanism when such changes are sensed. If the intermediate pins 103 be likened to the keyboard of an adding machine, a change of designation can be readily visualized as a change in the setting of the keys on such an adding machine. The change of designation sensing mechanism is merely a mechanical device for detecting a change in the setting of the keys of the hypothetical adding machine.

Referring to Fig. 4 it is seen that there is a designation slide 204 immediately above each locking slide 104. Each slide 204 is provided with a series of rectangular openings having a cam lug in the middle of one side of each rectangular opening. If it is assumed that each designation slide 204 is shifted rearwardly, it is evident that when an intermediate pin 103 is either elevated or released, slide 204 will be shifted forwardly a distance determined by the height of the cam at the side of the rectangular slot. Advantage is taken of such movement to trip the total taking mechanism when a change of designation occurs. At the forward end of each designation slide 204 there is an optionally settable interponent 205, settable under control of handle 210, to an upper or a lower position, the lower end of which may be interposed between the forward end of the designation slide 204 and a spring pressed bail supported by arms fixed to a shaft 151. Thus, if a slide 204 is moved, and the associated interponent 205 has been set in its lower position, shaft 151 will be rocked. Whereas, when an interponent 205 is set in its upper position, the movement of the associated slide 204 is ineffective on shaft 151.

Fixed to the end of shaft 151 is a latch 150 which is arranged to hold a lever 145 of the total taking mechanism in raised position during accumulating cycles. When shaft 151 is rocked, latch 150 is disengaged from lever 145 to initiate the operation of the total taking mechanism, as hereinafter described. In machines of this type, it is customary to cause totals to be taken upon a change of designation in one or more predetermined columns of the cards being sensed. Thus, when a run of cards is to be tabulated, handles 210 of the desired designating columns are set to place the associated interponents 205 in their lower or effective position. Thus, when a change of designation is sensed, shaft 151 is rocked to initiate a total taking operation.

If the machine is also to be arranged to take totals under control of special cards, as in the present case, the designation slide of the forty-fifth column, designated as 206 in Fig. 4, may be provided with only a few rectangular openings with cams on their sides. One of these openings may correspond to the perforation XII—45 for causing the total taking mechanism to operate under control of a special card so perforated. Similar openings may be provided for any number of positions of the forty-fifth column. As shown in Fig. 4, there are openings corresponding to perforation positions XII—45, XI—45, and X—45. It is obvious that there may be more or less of these rectangular openings with cam sides, as desired. The forward end of slide 206 is lengthened so that it is always in contact with the bail mounted on shaft 151, therefore, the operation of the total taking mechanism will always be initiated when slide 206 is shifted.

*Stop baskets and stop tray*

Figures 5, 17:
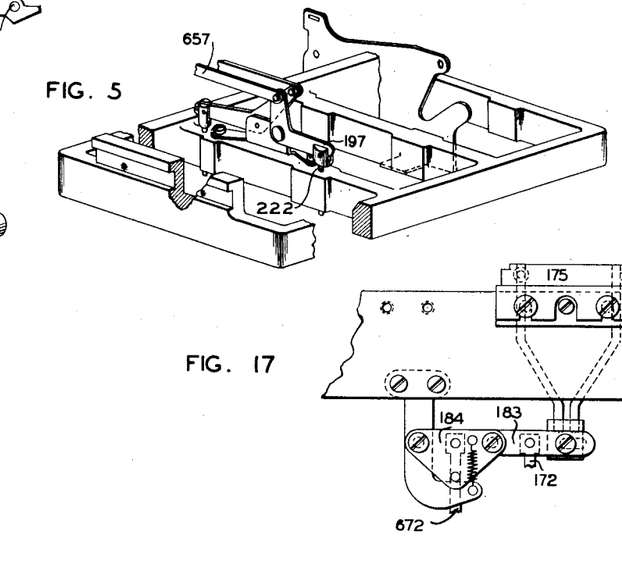
Fig. 5 is an isometric view of a stop tray.
Fig. 17 is an elevation of a portion of the naught block controlling mechanism.

For the purpose of mechanically representing sensed data for controlling each of the computing units, there is a mechanism therefor called a stop basket, and the support for all of the stop baskets is called a stop tray. The stop tray, as shown in Fig. 5, is a grid frame whose ends are supported by the end frames 4 of the computing component. The cross bars of the stop tray serve as supports for the side frames of the stop baskets, and at times as supports for supplemental tray pins and their operating mechanisms.

Each stop basket (Fig. 3) comprises a pair of separated main frames and guide plates for supporting and guiding the stops. In the type of stop basket shown in the drawings, there is a stop 223 for each digit of the decimal system. This type of stop basket is called a 45-column stop basket, for it is usually used with the familiar Powers 45-column cards. Each stop is resiliently urged downwardly, and each is provided with two laterally extending lugs, the lower one for guiding the lower end of the associated stop and the upper for shifting or holding shifted a frame supported slide 215 having a cam lug on its lower edge for each stop of the sequence of stops. The said slide 215 either rocks a bell crank 216, or holds it rocked, when a stop representing a significant digit is elevated; thus, disabling or holding disabled the corresponding zero stop. The control of the zero stops is described under the heading "Zero stop control."

*Computing units*

Each computing unit of the computing component includes a series or set of spring urged, pivotally supported, denominationally arranged type carriers 13, (Fig. 3) which are normally held in retracted position by restoring bail 41. Associated with each type carrier is a supplemental gear sector, or actuator, 14 having a limited relative movement with respect thereto. If the unit is provided with an accumulator having more than one accumulator wheel, the supplemental sector has a relative movement corresponding to the pitch of one tooth and this relative movement is utilized for carrying tens. The relative movement of the type carrier and gear sector is obtained, as usual, by a spring and pin-in-slot connection between the carrier and sector and is operated by a latch mechanism under control of the next lower ordered accumulator wheel. The extent of movement of each type carrier 13 during each tabulating operation of the machine is controlled by a stop projected into the path of a heel on the lower periphery of the supplemental sector 14.

Figure 3:
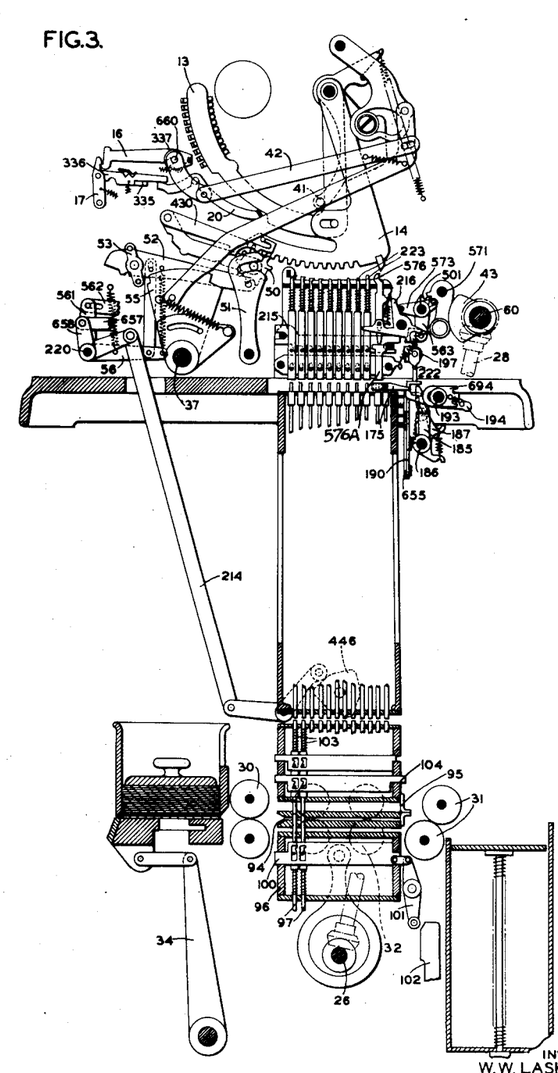
Fig. 3 is a conventional sectional view through a Powers tabulating machine equipped with the present invention.

In each computing unit, the usual accumulator, comprising a plurality of accumulator wheels 50, each arranged to be operated by the associated actuator 14, is mounted on a shaft carried by a cradle, and said cradle is arranged to be rocked by a pair of integrally connected cam arms 51 embracing the said shaft. Pivoted to one of the arms 51 is a doubly notched pitman 52, which, when the mechanism is in adding adjustment, has one of its notches in engagement with the upper of a pair of pins on the rocker 53. The pins are on opposite sides of the pivot of the rocker, which, in turn, is fixed to its supporting shaft. Said shaft is, in the usual manner, rocked through a spring biased wiper pawl assembly (not shown), during each machine cycle, by fan cam 55, shortly after the fan cam 55 (resiliently attached to the main oscillating shaft 37) rocks from its rest position; and again, shortly after fan cam 55 begins its return movement. When the described movements are followed, it is seen that the wheels 50 are lowered out of engagement with their actuators 14 near the beginning of the cycle and raised into engagement with the actuators near the mid point of the cycle. Thus, the amount represented by the perforations in a record is rolled into the accumulator as actuators are restored during the latter part of each machine cycle. This is the usual adding timing of the accumulator.

The pitmans 52 are usually made as a pair of spring connected elements, so that, if the teeth of the accumulator wheels 50 should accidentally strike the teeth of their actuators, breakage will not result, but the pitmans will merely be extended and the data taken from a card will be temporarily lost.

If pitman 52 is lowered so that the lower notch thereon engages the lower pin on the rocker 53, it is obvious that the engaging and disengaging movements of the wheels 50 are exactly opposite to that described in the penultimate paragraph. This is the total taking timing of the accumulator. Each pitman 52 is connected by a slotted link to a bell-crank 56 mounted on the total shaft 220, and the horizontal arm of each bell-crank is resiliently urged upwardly by a suitably located spring, hence each pitman 52 is resiliently urged upwardly so that its upper notch tends to engage the upper pin of the rocker 53. When shaft 220 is rocked, as described under the heading "Total taking mechanism", bell-crank 56 draws the pitman 52 downwardly, but the lower notch thereon may not engage the lower pin for the accumulator is usually in engagement with its actuators; therefore, the pin of the rocker supports the pitman in an abnormal position until after an initial amount of movement of the fan cam 55 and rocker 53; then the lower notch of the pitman engages the lower pin of the rocker as is assumed in the first sentence of this paragraph. Thus, when a total is to be taken, the accumulator is engaged with actuators 14 during their forward movement in the first portion of a machine cycle and the total of the amounts contained therein is rolled out.

Transfer mechanism

Figure 6:
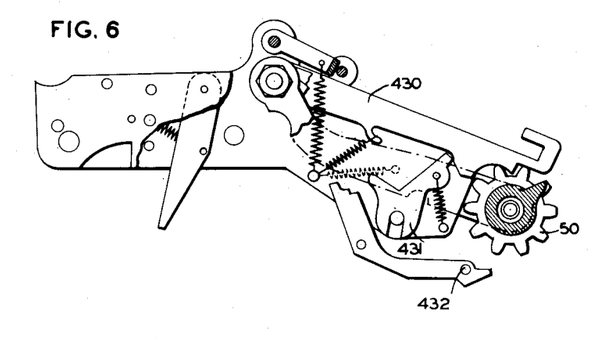
Fig. 6 is a detailed sectional elevation of the transfer mechanism of Fig. 3.

Each accumulator is equipped with the usual type of transfer or tens carrying mechanism as shown in Fig. 6.

When an accumulator wheel 50 completes a revolution, a steep cam thereon elevates a pawl 430 against the action of a spring, and said pawl is locked in elevated position by a pawl 431. If the pawl 430 is not elevated, the extent of return of the actuator 14 of the next higher denominational order is limited by a pin thereon that coacts with the squared end of the barb of the hook on said pawl 430. However, if the said pawl is elevated, the said pin passes into the crutch of the hook. The distance between the two limiting positions corresponds to the pitch of one tooth on the wheel 50. Thus, when an accumulator wheel completes a revolution it serves to move the next higher ordered wheel through one tooth space to effect the necessary transfer.

When the accumulator is disengaged, a bar between the sides of the accumulator cradle contacts with and rocks the tails of pawls 431, thus rocking them against the tension of their springs and thereby unlocking the pawls 430 which have been elevated, so as to permit them to descend. A spring urged aligner 432 is provided to lock the wheels 50 when they are disengaged from their actuators. A simple lever mechanism (not shown) rocks the supporting arms of the aligner to secure the necessary full disengagement of the aligner 432 when the accumulator is fully engaged with its actuators. In case one computing unit is not of sufficient capacity it is obvious that the hook end of the pawl 430 can be offset sufficiently to control the first denominational order of the adjacent actuating sector.

Printing hammer mechanism

Figure 7:
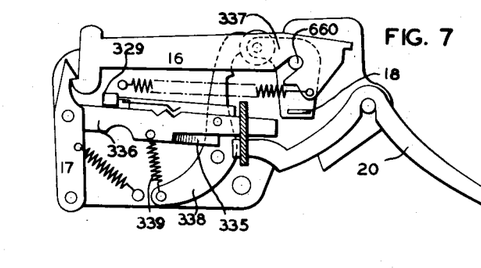
Fig. 7 is a detailed sectional elevation of the printing hammer mechanism of Fig. 3.

Each type carrier of each computing unit is provided with a normally restrained, resiliently urged, printing hammer 16 (Fig. 7) for percussively forcing a type against a platen supported print receiving medium. Each pivoted, resiliently urged hammer 16 is normally restrained by a resiliently urged latch 17, to which is pivoted a rearwardly extending spring urged strut 336, the rearmost end of which is normally below the arcuate path of a printing hammer controlling bail 18 which is mounted on shaft 660 and is common to the printing hammer assemblies of each computing unit. Below each strut is a lever 20 which, when rocked, elevates the rearmost end of the strut into the path of the bail 18. Lever 20 is rocked by a hump or cam on the corresponding type carrier 13 normally lying in an inactive position adjacent the rearmost end of lever 20. Thus, when the type carrier moves more than a predetermined extent from normal rest position, under control of the stops of the stop basket, it will rock the lever 20, and elevate the corresponding strut into the path of bail 18. Levers 20 are so arranged that when the associated type carrier advances only to zero position, the cam thereon is ineffective on lever 20. It is, therefore, necessary to provide for automatic printing of zeros. Mechanism for this purpose usually takes the form of bent over tails 335 integral with the described struts 336, and optionally settable slides mounted on the strut. An optionally settable splitting mechanism is conventionally represented as a pair of notches on the strut 336. In order to insure proper positioning of the strut members 336, in anticipation of contact by the levers 20, bail 18 is provided with arms 337 having rollers that cooperate with levers 338 connected at their lower ends by a rod which serves as an anchor for springs 339 connected to each strut 336. Thus, as the bail shaft 660 turns toward the position for releasing the printing hammers, the said rollers abruptly jar the levers 338 so that tension being abruptly applied to the springs 339, any strut 336, which may be stuck in a raised position is joggled into contact with its lever 20 and is ready to function properly, if the said lever is actuated by the corresponding print sector.

Zero stop control mechanism

The function of the zero stops is to prevent movement of the actuators if no significant digit stop has been elevated.

In former embodiments, the elevation of a significant stop served to lower or shift the zero stop out of the path of the actuator to permit the forward movement thereof. However, this arrangement frequently placed an undue load on the digit stop translator wire. It has been found by practice that a preferable method is to forcibly hold all the zero stops in ineffective position during the period in which the significant stops are set by the sensing mechanism, and to elevate the zero stops, in the columns in which a significant stop has not been raised, prior to the forward movement of the actuators.

Figure 8:
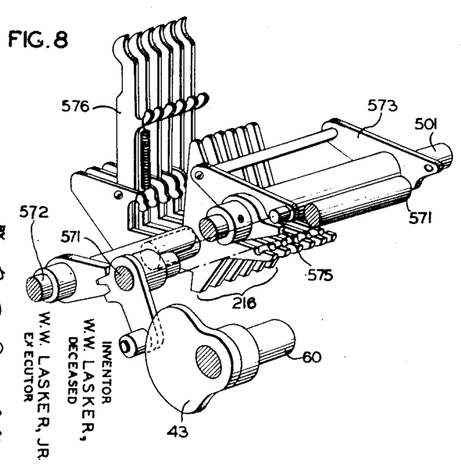
Fig. 8 is a detailed isometric view of the zero stop mechanism of Fig. 3.

For this purpose, each zero stop 576 (Figs. 3 and 8) is joined by a spring and pin-in-slot connection to a bell-crank 216, pivotally mounted on a transverse shaft. This arrangement permits the zero stop to be lowered when bell-crank 216 is rocked counter-clockwise, but also permits the elevation of a zero stop, independently of the bell-crank, when the associated translator wire or naught block is raised, as hereinafter described. A pendant arm on bell-crank 216 is arranged to coact with the rearward end of slide 215 of the associated row of digit stops so that the elevation of a digit stop, which cams slide 215 rearwardly, serves to hold bell-crank 216 rocked and thereby retain the zero stop in its lower position.

Due to the rotating movement of bell-cranks 216, a slight front to rear movement is imparted to the associated zero stops 576. To prevent binding of the parts in this arrangement, each zero stop rests on a lower portion 576A (Fig. 3) which is suitably guided for vertical movement and overlies the associated translator wire and naught block. Thus, the elevation of lower portion 576A causes the elevation of zero stop 576, whereas the zero stop may be moved, independently of portion 576A, by bell-crank 216, without damage to the parts. Inasmuch as lower portion 576A is provided solely to promote efficient operation, the zero stop assembly comprising elements 576 and 576A is, for convenience, referred to hereinafter as "zero stop 576."

Bell-cranks 216 are operated during each machine cycle by a cam 43 mounted on drive shaft 60. Cam 43 is arranged to rock an arm that is mounted on a transverse shaft 571 and is provided with a pair of gear teeth, which mesh with a toothed arm fixed to transverse rock shaft 501. Pivotally mounted on shaft 501 is a plurality of bails 573, each of which coacts with bell-cranks 216 of the associated computing unit. Fixed on shaft 501 is a plurality of arms 575, each of which underlies a stud on the rearward arm of the associated bail 573. Thus, when the high dwell of cam 43 operates the arm on shaft 571, shaft 501 and bails 573 are rocked counter-clockwise to rock bell-cranks 216 of each computing unit counter-clockwise, and thereby lower all zero stops 576. The contour of cam 43 is such that zero stops 576 are depressed during the period in which the significant stops are set by the sensing mechanism, and are released prior to the forward movement of the actuators.

When a total is to be taken, means are provided to release the zero stops of each computing unit to permit all actuators to move forwardly. For this purpose, an upright arm 561 (Fig. 3) is fixed to total shaft 220 and is connected by a slotted link 562 to a pendant arm 563, fixed on shaft 501. Thus, when shaft 220 is rocked during a total taking cycle, shaft 501 is held in rocked position irrespective of the position of cam 43, and thereby holds all zero stops depressed to release the associated actuators.

Total taking mechanism

The total taking mechanism consists of an intermittently operable shaft on which is fixed a scalloped disc 443 (Fig. 4); a ratchet wheel, a picker locking cam 445, a total cam 446, and a cam 112 for holding the card stop 95 in closed position and for holding the slides 104 in disabled position. As described in the above cited Patent 2,044,119, the complete total taking operation requires three actuations of the ratchet above mentioned. The first corresponds to a blank, or spacing operation of the computing component, and is provided for the purpose of re-setting any tripped transfer pawls 430 in the accumulators. The second actuation of the ratchet causes total shaft 220 to be rocked and held rocked during the total taking cycle to cause the accumulators to yield their totals. The third actuation is used for bringing the parts to normal, after the total has been printed. The said ratchet wheel contains nine teeth (or any suitable multiple of three), and the cams associated therewith are correspondingly shaped. When a total taking operation is initiated, the ratchet is driven by a spring pressed, pawl carrying, lever 145, which is actuated by a push rod operated by the steep snail cam 538 of the assembly 27 on shaft 26, so that the ratchet wheel is quickly moved a distance of one tooth for each rotation of shaft 26 at about the time the shaft has reached normal position, as shown in the Fig. 4. During accumulating cycles, lever 145 is held in raised position, to prevent the operation of the total taking mechanism, by latch 150 on shaft 151. However, when shaft 151 is rocked by the change of designation sensing mechanism, lever 145 is released and drops down upon its push rod whereby it is raised to rotate the ratchet wheel and associated cams for controlling the total taking operation.

The cam 445 is substantially triangular in shape, and is used to rock a linkage including link 519 and hook 447, for locking the lever assembly 33 when the picker is in substantially its most forward position. This linkage contains a spring and pin-in-slot connection to urge the hook 447 to locking position even if the link assembly 33 has not yet reached its extreme forward position, and serves to hold the picker against operation during the spacing and total taking cycles of the total taking operation.

The cam 446 cooperates with a bell-crank to which is pivoted a link 214 connected to an arm on total shaft 220 in the computing component (see also Fig. 3). Link 214 is drawn down at the initial part of the second step of movement of the total taking mechanism cam shaft and is held down throughout the total taking cycle, thus rocking shaft 220 and effecting the taking of totals as an incident to that cycle of operation following the first or spacing cycle.

The cam 112 rocks the arm 111 to hold the card stop 95 in closed position, thus causing any card, which has caused a tripping of the total taking mechanism, to remain in the sensing chamber during the spacing and total taking cycles of a total taking operation. Cam 112 also cooperates with an arm 116, which is fast to the shaft 114, to shift all the locking slides 104 against the action of their springs, and thus release all the intermediate pins 103. It will be remembered that each of the pins 103 is forced downwardly by a spring which is substantially stronger than the spring tending to elevate the sensing pins 97. Therefore, when cam 112 is operated, all stops in the stop baskets which were elevated during a total taking operation will immediately be withdrawn for the said intermediate pins 103 will follow the sensing pins 97 downwardly, as soon as the sensing box 86 starts downwardly. The lever 116 is under a very strong spring pressure, so that the initiation of the last step of movement of the total taking mechanism cam shaft results in a snap action whereby the cam shaft and the associated elements are restored to normal position and the machine is conditioned to resume regular tabulating operations in the cycle following the total taking cycle.

The scalloped disc 443 is arranged to hold latch 150 out of engagement with lever 145 during the total taking operation to permit successive actuations of the cam shaft by the lever. For this purpose the disc is provided with three equally spaced deep notches and has two shallow notches between each two deep notches. Cooperating with disc 443 is a follower on a pivotally mounted lever 153 which has a forward extension arranged to coact with a stud on latch 150. During tabulating operations, the follower lies in a deep notch on disc 443 and the extension is out of the path of movement of the stud on latch 150, thereby permitting the latch to hold lever 145 in raised position. When latch 150 is released and the total taking mechanism cam shaft is operated through one step by cam 538, the follower registers with a shallow notch on the cam disc and the forward extension on lever 153 prevents the reengagement of latch 150 and lever 145. Thus, lever 145 is free to be actuated a second step by cam 538. In this position of the parts, latch 150 is maintained out of engagement with lever 145 and the lever is free to be operated a third step by cam 538. After this movement the follower on lever 153 registers with a deep notch in disc 443, thereby rocking the rearward extension on the lever out of the path of the stud on latch 150. Therefore, the latch is engaged with lever 145 by its spring to prevent further actuation of the total taking mechanisms. When the ratchet wheel has been moved through three steps, all the parts are restored to positions corresponding to those previous to the release of latch 150 and the machine is thereby conditioned to resume accumulating operations.

Naught blocks

In many instances it is desirable to disable certain computing units or portions of computing units during either accumulating or total taking operations, or both. For example, it is often desirable to accumulate identical items from a single field of a record in a number of computing units by Y-wiring the translator wires in the manner disclosed in the patent to J. R. Merkle, No. 1,884,072, issued October 25, 1932, and to cause one of said units to yield the totals of groups of said items, another of said units to yield grand totals of a series of group totals, another of said units to yield great grand totals of a series of grand totals, etc. Since, in the type of machine referred to above, the acumulators of each computing unit are conditioned for yielding their totals simultaneously when total shaft 220 is rocked, means are provided to prevent the operation of all accumulators other than the group total accumulator, when a group total is to be taken; whereas, when a grand total is to be taken, means are provided to prevent the operation of all accumulators other than the group total and grand total accumulators. This can be done conveniently by causing all the zero stops of the other computing units to be elevated when a group total or a grand total is taken to prevent movement of actuators 14 in such units. For this purpose, each computing unit may be provided with a form of naught block 175 such as that shown in Figs. 9 and 10. Each naught block is mounted on the top of the translator frame underlying the zero stops of the associated computing unit and is provided with a plurality of holes of sufficient diameter to permit free passage of the translator wires, associated with the zero stops. The block is normally in ineffective position, in which its upper face is in substantially the same plane as the tops of the translator wires, and may be moved to an upper or effective position under control of either the sensing mechanism or total shaft 220. When the block is elevated it serves to raise all the zero stops 576 (Figs. 3 and 8) of the computing unit, against the tension of the springs connecting the zero stops to bell-cranks 216, and thereby hold all actuators 14 in their rearward position when bail 41 is operated. Thus, if the naught block is raised during a total taking cycle, the total contained in the associated accumulator is retained.

Figure 10:
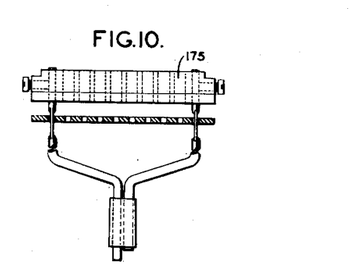
Fig. 10 is a rear elevation of the naught block of Fig. 9.

The naught blocks shown in the drawings are of sufficient size to control the zero stops of an entire computing unit. However, it is apparent that smaller blocks may be used for controlling portions of split computing units. If the block is to disable only one or two columns of a split computing unit under control of the sensing mechanism, it is mounted on a single translator wire to which it is soldered or attached by a set screw. However, in the case of disabling four or more columns, the upper end of the translator wire is usually branched as shown in Fig. 10 to prevent displacement or twisting. In the event two or more blocks are to be controlled by a single perforation in a card, a Y-wire may be used in the same manner as for digit stops.

*Naught block control mechanism*

Figures 9, 12, 14, 15:
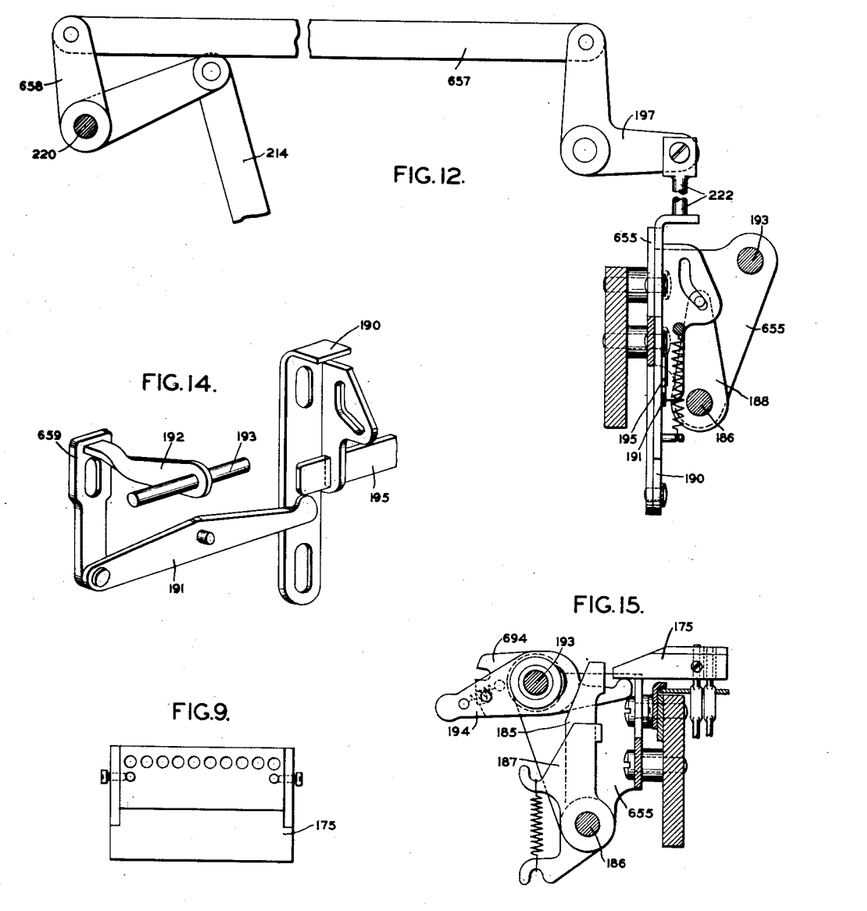
Fig. 9 is a plan view of a naught block.
Fig. 12 is a sectional elevation of the naught block controlling mechanism, taken along line 12—12 of Fig. 11.
Fig. 14 is another isometric view of a portion of the naught block controlling mechanism.
Fig. 15 is a sectional elevation of the naught block controlling mechanism, taken along line 15—15 of Fig 11.
Figure 11:
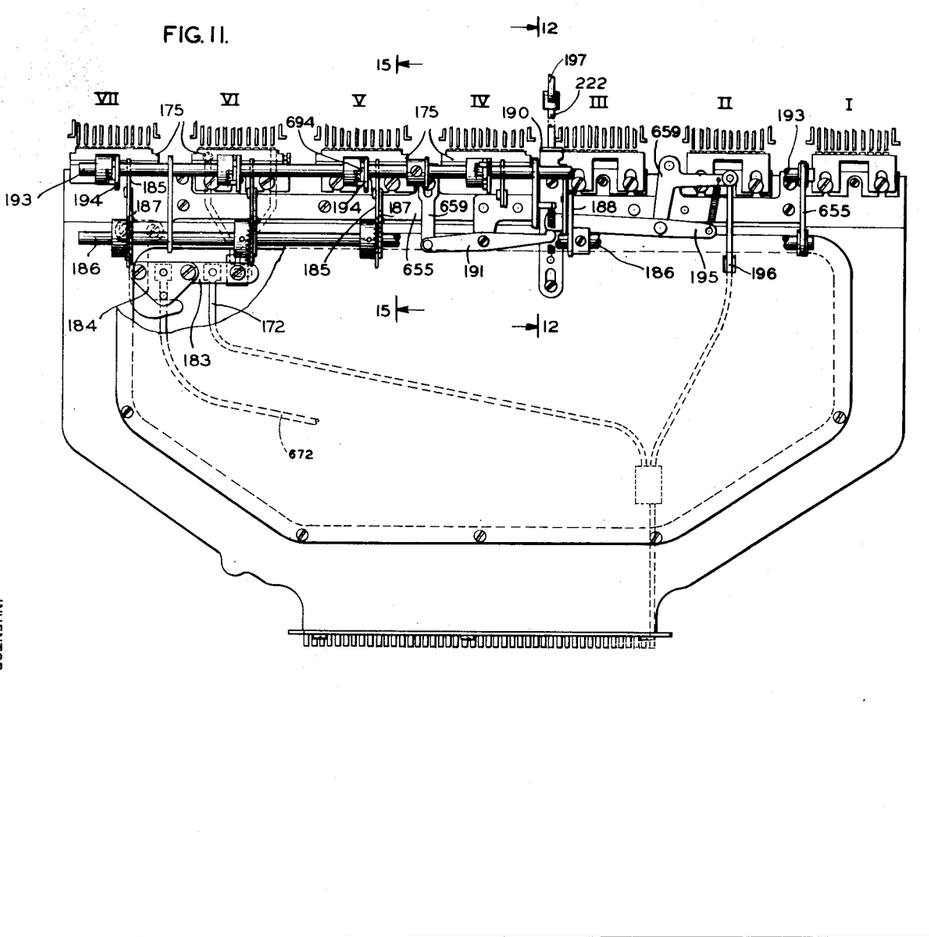
Fig. 11 is a rear elevation of a translator equipped with the naught block controlling mechanism of the present invention.

In the event that one of two Y-wired computing units is to be used for yielding totals and the other for yielding grand totals, mechanism such as that shown in Figs. 11 to 16, inclusive, may be used for controlling the operation of the associated naught blocks to attain this result. In Fig. 11, computing unit IV is arranged for yielding totals, and computing unit V for yielding grand totals. For this purpose, a shaft 186 is journaled in a bracket 655 mounted on the rear of the translator frame and is provided with an arm 188 having a stud that projects into a cam slot in a turned over ear on a slide 190 (Fig. 12). Slide 190 is provided with slots encompassing studs secured in bracket 655 and is resiliently urged upwardly by a suitable spring. A turned over ear on the upper end of slide 190 underlies a tray pin 222, which is slidably mounted in the stop tray and connected to the horizontal arm of a bell-crank 197, pivoted on a bracket on the stop tray (see also Fig. 5). The vertical arm of bell-crank 197 is connected by a link 657 to an arm 658 fast on total shaft 220 (see also Fig. 3). Thus, when shaft 220 is rocked during a total taking cycle it causes the depression of slide 190 which, in turn, by means of its cam slot, rocks shaft 186 counter-clockwise.

Guided in a slot in the turned over ear of slide 190 (Fig. 11) is an interponent 195, connected to a bell-crank 659, pivotally mounted on bracket 655, that normally overlies a lever 191, also pivoted on bracket 655. The other end of lever 191 is connected to a slide 659 (see also Figs. 13 and 14) having a slot encompassing an arm 192 fixed on a rock shaft 193, journaled in bracket 655. With this arrangement it is apparent that the depression of slide 190 during a total taking cycle also causes interponent 195 to rock lever 191 clockwise (Fig. 11) and thereby rocks shaft 193 clockwise (Fig. 12).

Also fixed on shaft 193 is an arm 694 (Fig. 11) having notches adapted to coact with a stud on a lever 194 (see also Fig. 15), slidably mounted on the shaft, the forward end of which extends under the rearward edge of the naught block 175 of the grand total unit. The rearward end of lever 194 (see also Fig. 16) is formed in the shape of a handle, so that the stud on the lever may be manually set to engage either notch in arm 694. A suitable spring serves to lock lever 194 in either position. The arrangement is such that when lever 194 is set in its lower position as in unit V (Fig. 11), the forward end thereof raises naught block 175 to effective position to prevent the operation of the computing unit when shaft 193 is rocked during a total taking cycle; whereas, when lever 194 is set in its upper position as in unit IV, the forward end thereof is ineffective on naught block 175 when shaft 193 is rocked.

Thus, when a change in group designation is sensed, the consequent rocking of shaft 220 serves to cause the group total to be taken from computing unit IV and also, prevents the operation of computing unit V to retain the accumulated total therein until a grand total is taken.

When a grand total is to be taken in a machine of this type, a special grand total card is interleaved in the card run at the point where a grand total is desired. The grand total card is provided with a special perforation in the forty-fifth column, usually at XI—45, which serves to initiate the operation of the total taking mechanism as described under the heading "Change of designation sensing mechanism." This special perforation also serves to elevate a translator wire 196 which extends through the cover plate on the translator and is connected to the horizontal arm of bell-crank 659. Thus, when a grand total card is sensed, bell-crank 659 is rocked counter-clockwise to shift interponent 195 out of engagement with the end of lever 191 and thereby prevent the rocking of shaft 193 during the total taking operation. Consequently, naught block 175 in computing unit V is not elevated by its lever 194 and the unit is in condition to yield its total in the usual manner. A suitable spring connecting interponent 195 and bell-crank 659 serves to return the interponent to its original position at the end of the grand total taking operation. When a grand total card is used, the last group total and the grand total are printed on the same line of the report sheet. If each is required on a separate line, the usual type of total card, having a perforation in the twelfth position of the forty-fifth column, may be inserted immediately before the grand total card. Then, the total card will initiate a total taking operation in which unit V is blocked and the group total is taken from unit IV, and the grand total card will initiate a grand total taking operation in which the grand total is taken from unit V.

If, in the above described arrangement, it becomes desirable to accumulate great grand totals in computing unit VI, then another lever 194 and arm 694 are mounted on shaft 193 and set in effective position for controlling naught block 175 of unit VI in the same manner as unit V. Then, when group totals are taken, blocks 175 in units V and VI are elevated, as above, to prevent clearing of these units. When grand totals are taken, however, the accumulated amount in computing unit VI must be retained until such time as a great grand total is taken. Inasmuch as the special perforation in the grand total card elevates translator wire 196 to prevent the operation of shaft 193, additional means are provided to render naught block 175 in the great grand total computing unit effective when a grand total is taken.

For this purpose, the naught block in computing unit VI is arranged as shown in Fig. 17 in which the wires guiding the naught block terminate in a block having a stud that projects into a slot in a lever 183. Lever 183 is pivoted on a plate 184 which is rotatably mounted on a bracket secured to the translator frame and is urged clockwise by a relatively strong spring connected to the bracket. A suitable limit stud prevents plate 184 from turning beyond its substantially horizontal position. Thus, plate 184 serves as a fulcrum for lever 183 and the elevation of a translator wire 172 on lever 183 raises the associated naught block to its effective position. However, if a second translator wire 672, connected to plate 184 is elevated at the same time, plate 184 is swung about its pivot and lever 183 is rocked on its fulcrum simultaneously. This combined movement merely results in elevating the fulcrum of lever 183 and the movement of translator wire 172 is rendered ineffective so that the associated naught block is not elevated.

Therefore, to raise naught block 175 (Fig. 11) in the great grand total computing unit when a grand total is taken, translator wire 172 is joined to translator wire 196 by the usual Y-wire connection. Thus, the above described perforation at XI—45 in the grand total card raises wire 196 to render the naught block in the grand total computing unit ineffective, and raises wire 172 to render the naught block in the great grand total computing unit effective.

It will be noted, as stated under the heading "Total taking mechanism," that locking slides 104 (Fig. 4) are held released during a total taking operation so that the translator wires follow the sensing pins up and down during each cycle thereof. Obviously, any naught block that is to be rendered effective by a translator wire would be lowered prior to the release of actuators 14 unless latching means are provided to hold the block in raised position during the total taking cycle. For this purpose, a latch 185 (Figs. 11 and 18), arranged to coact with naught block 175 in computing unit VI, is pivotally mounted on shaft 186 and is resiliently connected to a limit arm 187, fast on the shaft. Thus, when shaft 186 is rocked counter-clockwise during the total taking cycle, which occurs at the time the sensing mechanism has raised the translator wires to their highest position, latch 185 is shifted under the naught block and serves to hold it in raised position throughout the total taking cycle to prevent the operation of computing unit VI. At the end of the cycle, shaft 186 is returned to its former position and limit arm 187 withdraws latch 185.

When a great grand total is to be taken in a machine arranged as above, means must be provided to, 1. Initiate the operation of the total taking mechanism, 2. Elevate translator wire 196 to prevent the operation of the naught blocks in units V and VI under control of shaft 193, and 3. Prevent the operation of the naught block in unit VI under control of translator wire 172. To attain these results the great grand total is taken under control of a special card having one perforation at XI—45 which, as in the case of a grand total card, serves to initiate the operation of the total taking mechanism and to disable shaft 193 by withdrawing interponent 195, and a second perforation, in any suitable control position, to elevate translator wire 672 and thereby prevent the raising of the naught block in unit VI under control of wire 172. Thus, when a great grand total card is sensed, the naught blocks in units V and VI are rendered ineffective and the associated accumulators are cleared in the usual manner.

When a great grand total card is sensed it causes the last group total, the last grand total, and the great grand total to be printed on the same line. When each is required on a separate line, a total card, a grand total card and a great grand total card are inserted consecutively in the card pack and will serve to control the respective types of total taking operations in the order named.

In the event that another grade of totals is required, computing unit VII of Fig. 11 may also be equipped with the type of mechanism shown in Fig. 17. In that case the associated lever 194 is set in its lower position and another translator wire, arranged in the same manner as wire 172 of unit VI, is branched from translator wire 196. Thus, computing unit VII would be blocked during total taking, grand total taking, and great grand total taking operations, and its accumulator could only be cleared when a special card was sensed which has a perforation arranged to elevate its associated control wire corresponding to wire 672 of unit VI.

Obviously, each other computing unit of the machine may be arranged in the same manner. Therefore, it is apparent that the number of grades of totals that may be taken in a given machine is limited only by the number of computing units therein.

Figures 13, 16, 18, 19:
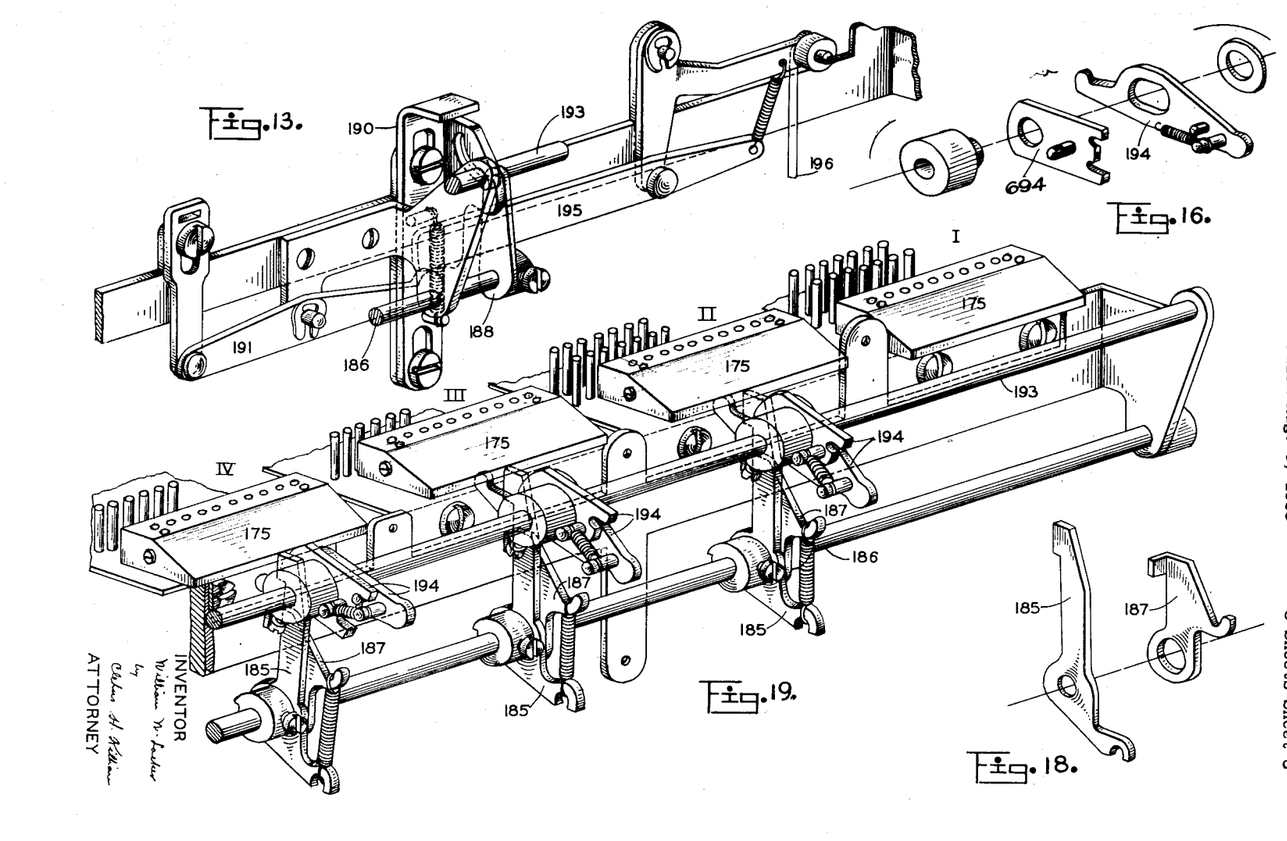
Fig. 13 is an isometric view of a portion of the naught block controlling mechanism.
Fig. 16 is an exploded isometric view of a manually operable naught block control.
Fig. 18 is an exploded isometric view of a naught block latching mechanism.
Fig. 19 is an isometric view of a plurality of naught blocks and a portion of the naught block controlling mechanism, in operated position.

In practical application it frequently occurs that a translator may be designed for controlling the preparation of different types of report sheets. In these cases, a naught block may be arranged to be elevated by the total taking mechanism in the preparation of one type of report, and to be elevated by the sensing mechanism in the preparation of another type of report. Therefore, each naught block, so arranged, is provided with a suitable lever 194 and a latch 185 as shown in Fig. 11. Then, when slide 190 is depressed under control of total shaft 220, shaft 186 is rocked by the cam slot in slide 190 acting on the pin in arm 188, and all latches 185, connected by springs to limit arms 187, rock as if they were fixed on shaft 186, when the corresponding naught blocks are elevated. However, if certain of the naught blocks are not elevated, then the corresponding latch 185 is blocked by the rearward edge of the naught block and the spring, connecting members 185 and 187, is merely stretched. Hence, depression of slide 190 causes all naught blocks which have been elevated by the sensing mechanism, to be latched in raised position and to remain in such position when the sensing box descends, and thereby causes the disabling of the corresponding computing unit or split portion of a computing unit. The same result will occur, irrespective of the mode of elevation of the naught blocks. However, in the case where a naught block is elevated by a lever 194 under control of total shaft 220, it is apparent that the associated latch is in the nature of supernumerary mechanism since total shaft 220 serves to hold the block in raised position throughout the total taking cycle. This condition is illustrated in Fig. 19 in which shafts 193 and 186 have been rocked. Naught block 175 in computing unit I is not automatically controlled, while those in computing units II, III, and IV are automatically controlled. Due to the setting of levers 184, naught blocks 175 in units II and III are elevated while that in unit IV remains ineffective. Thus, latches 185 in units II and III are shifted under the associated naught blocks, whereas latch 185 in unit IV is blocked by the rearward edge thereof.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim and desire to secure by Letters Patent is:

1. In a record card controlled tabulating machine, the combination of an accumulator having a plurality of accumulator wheels, a type carrying actuator for actuating each accumulator wheel in accordance with the extent of its movement, a record-controlled zero stop element and a plurality of record-controlled digit stop elements adapted to govern the extent of movement of each actuator, total taking mechanism under record control for causing the accumulator to yield its total, a naught block arranged to coact with the zero stop elements and having an effective and an ineffective position, said naught block being adapted when effective to actuate the zero stop elements associated with all the actuators to prevent the operation of the accumulator and adapted when ineffective to permit independent and individual actuation of each zero stop element, means to render the naught block effective under the control of the total taking mechanism, and record-controlled means to render the naught block ineffective when said total taking mechanism operates, said last mentioned means comprising means for disengaging the naught block from the control of the total taking mechanism.

2. The combination of an accumulator, members movable relative to said accumulator for inserting amounts therein and for taking totals therefrom, a zero stop for each movable member, each of said zero stops being arranged when operated to prevent movement of the associated member, a naught block coacting with and movable to a position to operate said zero stops, actuating means to move said naught block to said last mentioned position, and record controlled means to free the naught block from the control of the actuating means.

3. The combination for an accumulator, members movable relative to said accumulator for inserting amounts therein and for taking totals therefrom, a zero stop for each movable member, each of said zero stops being arranged when operated to prevent movement of the associated member relative to the accumulator, a naught block coacting with and movable to a position to operate said zero stops, actuating means to move said naught block to said last mentioned position, and record controlled means to prevent movement of the naught block by said actuating means.

4. The combination of an accumulator, members movable relative to said accumulator for inserting amounts therein and for taking totals therefrom, a zero stop for each movable member, each of said zero stops being arranged when operated to prevent movement of the associated movable member relative to the accumulator, a naught block coacting with and movable to a position to operate said zero stops, actuating means comprising a linkage including a removable interponent to move the naught block to said last mentioned position, and record controlled means to withdraw said interponent from said linkage whereby the naught block is disengaged from the control of the actuating means.

5. The combination of an accumulator, members movable relative to said accumulator for inserting amounts therein and for taking totals therefrom, a zero stop for each movable member, each of said zero stops being arranged when operated to prevent movement of the associated movable member relative to the accumulator, a naught block coacting with and movable to a position to operate said zero stops, actuating means comprising a linkage including a removable interponent to move the naught block to said last mentioned position, and record controlled means to withdraw said interponent from said linkage whereby the actuating means is rendered ineffective to move the naught block.

6. The combination of an accumulator, members movable relative to said accumulator for inserting amounts therein and for taking totals therefrom, a zero stop for each movable member, each of said zero stops being arranged when operated to prevent movement of the associated movable member relative to the accumulator, a naught block coacting with and movable to a position to operate said zero stops, actuating means to move said naught block to said last mentioned position, said actuating means comprising a linkage operable by a rock shaft and including a removable interponent, the construction and arrangement being such that the naught block is moved when said rock shaft is rocked, and record controlled means to withdraw said interponent from said linkage whereby the operation of said linkage by said rock shaft is ineffective to move the naught block.

7. In a machine of the class described having record sensing mechanism, the combination of an accumulator, members movable relative to said accumulator for inserting amounts therein and for taking totals therefrom, a zero stop for each movable member, each of said zero stops being arranged when operated to prevent movement of the associated movable member relative to the accumulator, a naught block coacting with and movable to a position to operate said zero stops, actuating means operable by a special perforation in a record to move the naught block to said last mentioned position, and means operable by a second special perforation in a record to free the naught block from the control of the actuating means when the first mentioned special perforation is sensed.

8. In a record controlled machine, the combination of an accumulator, members movable relative to said accumulator for inserting amounts therein and for taking totals therefrom, a zero stop for each movable member, each of said zero stops being arranged when operated to prevent movement of the associated movable member relative to the accumulator, a naught block coacting with and movable to a position to operate said zero stops, actuating means to move said naught block to said last mentioned position, said actuating means comprising a record controlled lever pivotally mounted on a movable support and connected to the naught block, the construction and arrangement being such that the actuation of said lever under control of a special perforation in a record serves to move the naught block, and means controlled by a second special perforation in a record to displace said support whereby the operation of the lever under control of the first mentioned special perforation is ineffective to move the naught block.

WILLIAM W. LASKER.